United States Patent
Bremer (10) Patent No.: US 6,725,742 B2
(45) Date of Patent: Apr. 27, 2004

(54) USE OF STUDS IN A BICYCLE SHOE AND PEDAL SYSTEM

(76) Inventor: David Albert Bremer, 94-265 Ihuanu Pl., Mililani, HI (US) 96789

( * ) Notice: Subject to any disclaimer, the term of this patent is extended or adjusted under 35 U.S.C. 154(b) by 0 days.

(21) Appl. No.: 10/071,804

(22) Filed: Feb. 6, 2002

(65) Prior Publication Data

US 2003/0145677 A1 Aug. 7, 2003

(51) Int. Cl.$^7$ .............................. G05G 1/14; A43B 5/00
(52) U.S. Cl. ...................................... 74/594.6; 36/131
(58) Field of Search .................. 74/594.4, 594.5, 74/594.6; 36/131, 132, 134, 135

(56) References Cited

U.S. PATENT DOCUMENTS

| | | | |
|---|---|---|---|
| 4,538,480 A | | 9/1985 | Trindle ...................... 74/594.5 |
| 4,662,090 A | | 5/1987 | Solano ......................... 36/131 |
| 4,876,808 A | * | 10/1989 | Hsieh ........................... 36/131 |
| 4,893,523 A | | 1/1990 | Lennon ..................... 74/594.6 |
| 4,953,425 A | | 9/1990 | Barefoot .................... 74/594.6 |
| 5,211,076 A | * | 5/1993 | Baume et al. ............. 74/594.6 |
| 5,269,200 A | * | 12/1993 | Hawkins .................... 74/594.6 |
| 5,284,066 A | * | 2/1994 | Weiss ......................... 74/594.6 |
| 5,771,757 A | | 6/1998 | Hanamura ................. 74/594.4 |
| 5,836,094 A | * | 11/1998 | Figel ............................ 36/131 |
| 5,924,220 A | * | 7/1999 | Ueda et al. ................... 36/131 |
| 5,943,795 A | * | 8/1999 | Ueda et al. ................... 36/131 |
| 2002/0194951 A1 | * | 12/2002 | Lowe ......................... 74/594.6 |

* cited by examiner

*Primary Examiner*—Chong H. Kim (57) ABSTRACT

The use of one or more studs attached to the sole of a bicycle shoe as a means of engagement of the shoe with a corresponding pedal. The studs are similar in design to lugs, cleats, spikes, or studs conventionally attached to the soles of soccer, football, or other outdoor sport shoes as a means of enhancing traction on turf or dirt. In a preferred embodiment of the pedal, a cylindrical ring connects a pedal body and legs and provides a means for sandwiching studs in slots between the ring and a pedal cage. The stud-based shoe and pedal system is especially suited for mountain bicycling. The shoe readily releases from the pedal in unanticipated stops, thus preventing injury, and enables a cyclist to maintain firm contact with pedals in steep or treacherous terrain. The shoe performs well both on and off a bicycle when the cyclist is riding and running in difficult conditions commonly associated with off-road bicycling.

3 Claims, 6 Drawing Sheets

USE OF STUDS IN A BICYCLE SHOE AND PEDAL SYSTEM

FEDERALLY SPONSORED RESEARCH

Not applicable.

SEQUENCE LISTING

Not applicable.

BACKGROUND

1. Field of Invention

This invention relates to a bicycle shoe and pedal system including a novel application of shoe studs conventionally used in soccer and other outdoor sports, more specifically the invention relates to the use of studs as a means of engaging a bicycle shoe with a bicycle pedal.

2. Description of Related Art

Off-road or mountain bicycling often involves riding in rough terrain over hills, rocks, roots, and other obstructions that pose special requirements for bicycle shoes and pedals. The ideal shoe and pedal system would enable the shoe to exert pushing and pulling force on the pedal without slipping, stay firmly in contact with the pedal over difficult terrain, allow the foot to pivot or float on the pedal to prevent knee strain, release quickly to enable a rider to extend a foot to the ground to prevent a fall when stopping unexpectedly, readily re-engage with the pedal after frequent stops, and provide good traction and light weight for running or walking with the bicycle.

Pedal toe clips and straps traditionally used to prevent a bicycle shoe from slipping off a pedal have distinct disadvantages when riding off-road. Shortcomings of toe clips and straps include the pedal initially disposed upside down due to the weight of the clip and strap, difficulty inserting the shoe through the opening formed by the strap, the need to reach down and tighten or loosen the strap by hand, and the consequent inability to rapidly remove feet from pedals in the event of an unanticipated stop. U.S. Pat. No. 4,953,425 to Barefoot (1990) discloses a diagonal strap enabling easier entrance and exit of the shoe to and from the pedal. The mountain bicyclist tightens the diagonal strap by inward rotation of the heel of the shoe, so the strap can be loosened in anticipation of difficult terrain to permit quicker exit. Unfortunately by loosening the strap in rough riding, the cyclist has a less secure grip on the pedal at a time when more control is needed. In an unanticipated event such as a bicycle wheel slipping sideways in loose terrain, the bicycle rider with a tightened strap may not have time to loosen the strap and remove the shoe quickly enough to prevent a fall and possible injury. Another problem with the diagonal strap is that with wear or in wet or muddy conditions, the strap tends to flatten preventing easy insertion of the shoe. Lastly the need to twist the heel inward, toward the bicycle, to tighten the strap decreases the degree of "float," that is, the freedom to rotate the foot on the pedal to lessen strain on knees while pedaling.

As an alternative to toe clips and straps, clipless bicycle pedals use mechanical binding mechanisms to engage a cleat, or plate, on the rider's shoe to securely attach shoes to pedals. Release of shoes from clipless pedals requires outward twists of the cyclist's heels. In some unexpected or emergency situations, the cyclist may have difficulty executing the outward ankle twist resulting in delayed or unsuccessful release of the shoe from the pedal. During a fall, if the shoe remains attached to the pedal, the high torque created and applied to the foot, ankle, leg, knee, and hip may result in severe injury. This problem can be exacerbated in typical off-road conditions where dirt or mud impairs the release mechanisms of many pedals. Even when the outward twist release maneuver can be executed smoothly with both shoes, the fraction of a second required to complete the movement may significantly delay the extension of the rider's foot to the ground necessary to prevent a fall. When riding in difficult or steep terrain, a rider may try to use the pedal without clamping the shoe to the pedal. However, most clipless pedals do not provide enough contact surface for effective pedaling, especially since great pedaling forces often must be applied.

U.S. Pat. No. 5,771,757 to Hanamura (1998) describes a clipless bicycle pedal with a large shoe contacting area. This pedal is intended to allow the cyclist encountering rough terrain to disengage the bicycle shoe from the clipless mechanism to pedal on the large contact surface. The problem then is that in the most difficult terrain, the cyclist is left with the least secure grip on the pedal. Thus, the mountain bicyclist using clipless pedals must choose between riding through rough terrain with shoes resting loosely and inefficiently on pedals or keeping shoes firmly attached and risking injury from a sudden fall preventing release of shoes from pedals.

Another disadvantage of clipless shoes has been discomfort, lack of traction, and clogging of the cleat with dirt when walking. Spikes, cleats, lugs, or studs similar to those used on football and soccer shoes are now commonly attached to the soles of clipless shoes to improve traction and comfort when walking or running with the bicycle over difficult terrain. Such studs have not been used to engage the shoe with the pedal, rather they have been disposed on the heel, toe, and perimeter portions of soles away from functional contact with pedals. Clipless cleats are plates attached to shoes for the purpose of engaging the shoes with pedals. Clipless cleats do not improve traction on turf or dirt and are dissimilar to the studs designed to enhance footing on the ground in outdoor sports such as soccer, football, and baseball and more recently in off-road bicycling. Fouling of the clipless cleat with dirt continues to be a problem.

Other devices involving shoe-mounted studs or lugs that mate and lock with receivers formed on bicycle pedals disclosed in U.S. Pat. No. 4,538,480 to Trindle (1985), in U.S. Pat. No. 5,269,200 to Hawkins (1993), in U.S. Pat. No. 5284.066 to Weiss (1994), and in U.S. Pat. No. 4,893,523 to Lennon (1990) also may prevent release in emergency or unexpected stops and offer no advantages to the off-road cyclist over clipless pedals or straps. Such studs also interfere with walking and are dissimilar to the studs traditionally used on outdoor sport shoes to improve traction on turf. U.S. Pat. No. 4,876,808 to Hsieh discloses studs or posts mounted to a bicycle pedal that mate with apertures in a sole of a bicycle shoe to allow the shoe to be used for both cycling and running. The posts are designed to snap firmly into the composite sole thus may also prevent release in an unanticipated stop.

U.S. Pat. No. 4,662,090 to Solano (1987) discloses a shoe with a recessed sole designed to fit snugly around a platform pedal holding the shoe in a stable position in contact with the pedal while the bicyclist is riding over rough terrain. A problem with this design is that the shoe cannot pivot on the pedal thus providing no float to protect the rider's knees. Another disadvantage of the recessed sole is that the added thickness in the remainder of the sole adds weight to the shoe without improving traction while walking. In wet conditions, the tightness of the fit of the recessed sole to the pedal can result in difficulty inserting pedals into mud-clogged soles. A similar concept disclosed in U.S. Pat. No. 5,211,076 to Baume et al. (1993) involving contoured bars on the sole of a bicycle shoe matched with a complementary contoured pedal also prevents the shoe from pivoting on the pedal and functioning may be further impaired in muddy conditions.

U.S. Pat. No. 2002/0194951 to Lowe describes in one embodiment a contoured sole in a ring-shaped pattern matched with a ring-shaped pedal body that allows the cyclist to pivot the shoe. Lowe's system locks the shoe to the pedal by a retaining lip on the shoe ring that snaps onto the pedal ring. This system also may prevent or delay release in emergency or unexpected stops and offers no advantages to the off-road cyclist over clipless pedals or straps.

Due to difficulty releasing shoes from straps and clipless pedals, many mountain bicyclists prefer to use traditional platform pedals equipped with a plurality of protrusions in the form of dished teeth or pins to provide better traction between shoes and pedal cages. When a shoe does slip from such a pedal, the teeth or pins on the pedal cage can inflict a painful gash to the shin of the rider. Wearing shin guards is a common practice to reduce such injuries and is recommended as a safety precaution by manufacturers of such pedals.

Figure 1:
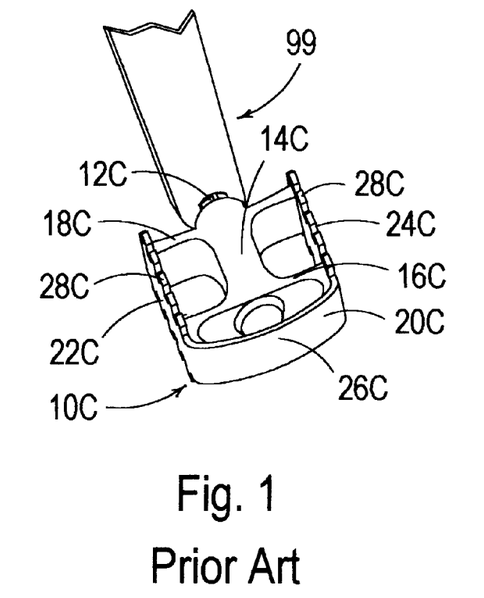
FIG. 1 shows a perspective view from above of a pedal with a U-shaped cage.

FIG. 1 shows perspective view of a conventional pedal 10C with a threaded spindle 12C engaged in a crankarm 99 of a bicycle (not shown). The threaded spindle 12C is journalled in a pedal body 14C with a plurality of outer legs 16C and inner legs 18C attached to a U-shaped cage 20C. The cage 20C is comprised of a rear cross member 22C and a front cross member 24C connected by an outer cross member 26C. The rear and front cross members 22C and 24C have serrated edges, or dished teeth 28C.

Figure 2:
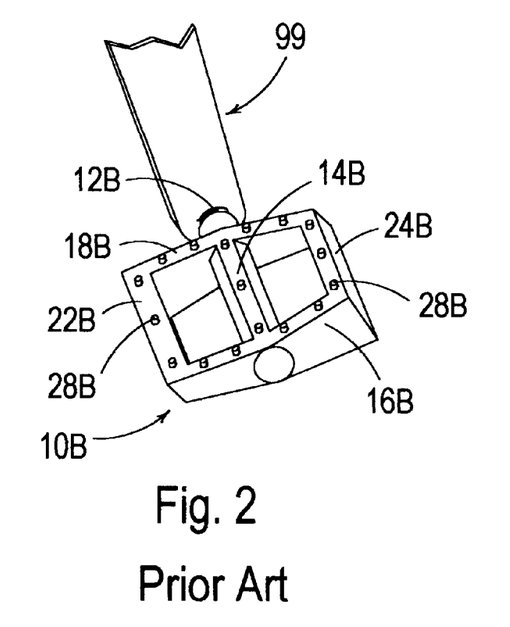
FIG. 2 shows a perspective view from above of a box-shaped pedal.

FIG. 2 shows a perspective view of a conventional generally rectangular or box-shaped cage pedal 10B also with a threaded spindle 12B engaged in a crankarm 99. The box-shaped pedal 10B is similarly comprised of the threaded spindle 12B journalled in a pedal body 14B. Extending from the body 14B, a plurality of outer legs 16B and inner legs 18B connect to a rear cross member 22B and a front cross member 24B. Embedded cylindrical pins 28B protrude along the upper and lower surfaces of the pedal body 14B, the legs 16B and 18B, and the cross members 22B and 24B.

The dished teeth 28C and the pins 28B help to prevent shoes (not shown) from sliding forward and backward on the pedals 10C and 10B respectively. However, as discussed above, the teeth 28C or the pins 28B expose the cyclist to risk of injury when the pedal 10C or 10B strikes the cyclist's leg. Consideration of alternatives to hazardous pedals led to the current invention that involves mounting protrusions on a shoe rather than on a pedal.

SUMMARY OF THE INVENTION

The present invention solves the above-discussed problems and achieves a technical advance in the art by providing a method and apparatus in a bicycle shoe and a corresponding pedal that have the advantages of the idealized shoe and pedal above characterized. Studs, traditionally used in outdoor sports to improve traction on turf and dirt, are used in a novel way in the present invention to maintain the position of the cyclist's shoe on the pedal enabling the cyclist to ride more efficiently and safely over rough terrain. In accord with the present invention, a bicycle shoe and pedal system comprises a shoe with studs as a means for force-transmitting engagement with a corresponding slot in a bicycle pedal. The shoe is comprised of an upper portion connected with a sole. At least one stud is attached to the sole as a means to engage the pedal. The pedal is comprised of a threaded spindle journalled in a pedal body, a plurality of legs extending from the body to a cage, and at least one stud-engaging slot disposed between the body, legs, and cage. The pedal legs, disposed laterally more toward the center of the pedal than legs on conventional pedals shown in FIGS. 1 and 2, allow room for studs positioned near the inner and outer edges of the sole as necessary for efficient and safe walking on the shoe.

Objects and Advantages

Accordingly, several objects and advantages of the present invention are:

(a) ease of insertion of the shoe onto the pedal, (b) firm connection of the shoe to the pedal allowing horizontal pushing and pulling force to be applied as well as downward pressure on the pedal, (c) stability of the shoe on the pedal with no need to disengage or loosen the shoe from the pedal when riding over rough terrain, (d) easy and rapid release of the shoe from the pedal as part of a natural motion in moving the foot up and away from the pedal then to the ground to prevent a fall, (e) float allowing the heel to rotate relative to the ball of the foot thus preventing knee pain and discomfort in long rides, (f) safety in readily releasing the shoe from the pedal as well as in being able to ride on smooth pedal cages that will not gash shins, (g) excellent traction in running up hills and walking or carrying the bicycle in terrain that does not permit riding, (h) functions well in dirt, mud, and other adverse conditions, (i) improved traction and safety when riding in snow or on ice, (j) light-weight, inexpensive, and maintenance-free, (k) no special skill or learning period required, and (l) enhanced enjoyment in off-road riding by shifting attention away from the pedals and onto the trails.

Still further objects and advantages will become apparent from a consideration of the ensuing description and drawings.

DRAWINGS

Drawing Figures

In the drawings, the figures that are closely related have the same number but different alphabetical suffixes. Please note that for the purposes of orientation the terms or phrases "front," "forward," "forward of," etc. are used in the sense of the portion of the bicycle pedal, shoe, or sole attachments closest to the front of the bicycle. The terms "back," "rear," "behind," etc. are oriented in the opposite direction, toward the rear of the bicycle. The terms "inside," "inner," "inward," etc. refer to parts of the pedal, shoe, or sole attachments located toward the bicycle, while "out," "outside," "outward," etc. refer to the direction away from the bicycle. Where relevant, all drawings are of right-hand parts, specifically of right shoes and pedals.

Drawings—Prior Art—Conventional Platform Pedals

Drawings—A Shoe with a Preferred Pedal

Drawings—A Shoe with an Alternate Pedal

Drawing—Alternate Stud Shapes and Means of Attaching Studs to the Sole

DETAILED DESCRIPTION OF THE CURRENT INVENTION

Figure 3:
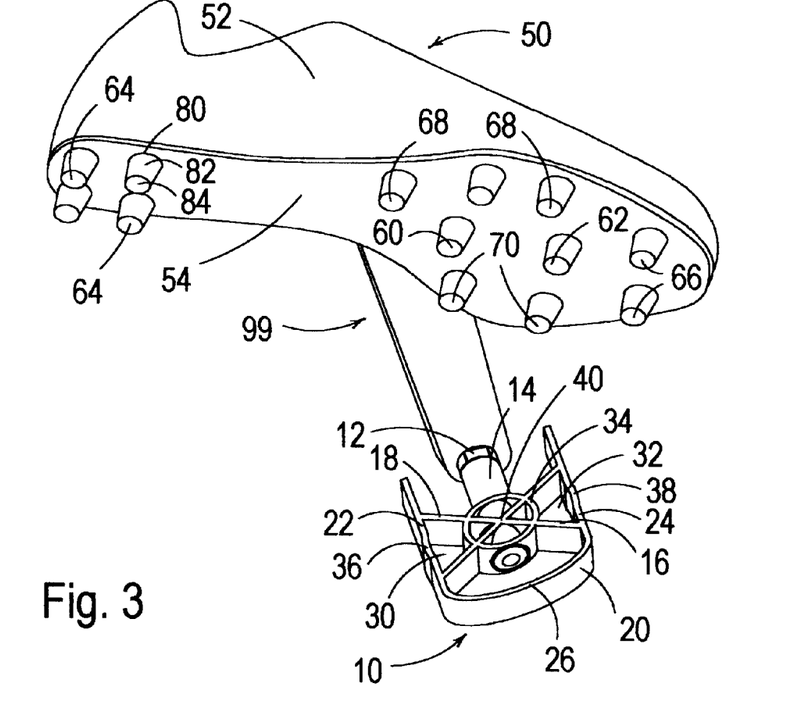
FIG. 3 shows a perspective view of a shoe above a preferred pedal.
Figure 4A:
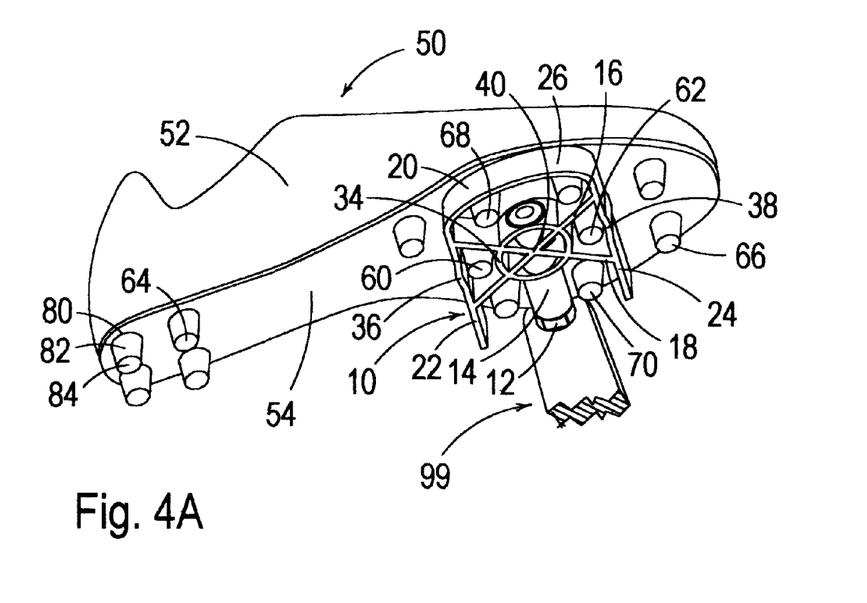
FIG. 4A shows a bottom perspective view of the shoe on the preferred pedal.
Figure 4B:
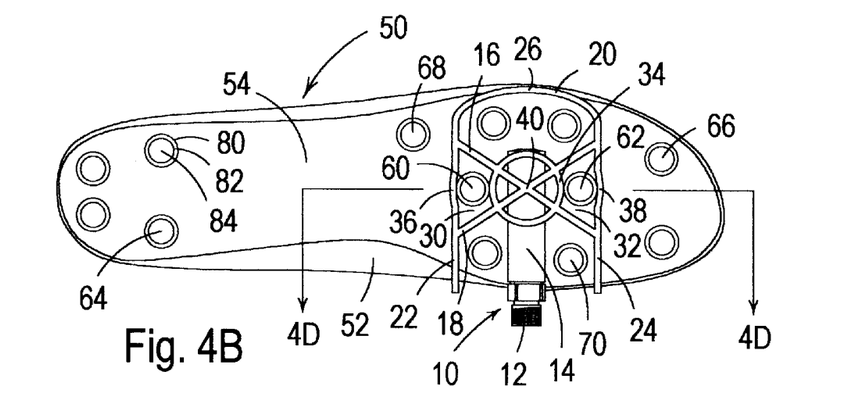
FIG. 4B shows a bottom plan view of the shoe on the pedal.

Description—FIGS. 3, 4A–4D, 5A, 5B, and 6—Preferred Embodiments of a Shoe and a Pedal FIG. 3 shows a perspective view of preferred embodiments a shoe 50 and a pedal 10, and FIGS. 4A–4D show the shoe in place centered on the pedal. The shoe is comprised of an upper portion 52 attached to a sole 54. Molded or attached to the sole is a plurality of lugs, cleats, spikes, or studs 60, 62, 64, 66, 68, and 70. The studs are of the type traditionally worn when playing field sports such as soccer or football on outdoor turf or dirt. The studs are of frusto-conical shape and have a base 80, a wall 82, and a cap 84. The base 80 is the portion attached to the sole 54 of the shoe. The cap 84 is the portion that first contacts the ground when the wearer of the shoe takes a step. The wall 82 is the surface extending between the base 80 and the cap 84. Studs are composed of metal, rubber, plastic, or other material or combinations thereof As shown in the bottom view of FIG. 4B, the pedal 10 is comprised of a threaded spindle 12 journalled in a pedal body 14. A plurality of outer legs 16 and inner legs 18 extend from the pedal body 14 to a cage 20. As illustrated in perspective views in FIGS. 3 and 4A, the threaded spindle 12 is engaged in a crankarm 99 of a bicycle (not shown). Compared to conventional pedals 10C and 10B in FIGS. 1 and 2, the outer legs 16 and inner legs 18 as shown in FIG. 4B are disposed closer together and toward the middle portion or pivot point 40 of the pedal 10.

As shown in FIGS. 3 and 4A, a cylindrical ring 34 is disposed between the body 14 and the cage 20 of the pedal 10 in the preferred embodiment. The body 14 and the legs 16 and 18 transect the ring 34. The cage 20 is comprised of a rear cross member 22 connected to a front cross member 24 by an outer cross member 26. At about the center of the rear cross member 22 and the front cross member 24, each of these cross members has a curved section, arc, or arch, 36 and 38 respectively, concentric with the ring 34. The rear arch 36 and the front arch 38 share a center, or pivot point 40 with the ring 34 at the juncture or crossing of the pedal legs 16 and 18. Rear and front drive-stud slots 30 and 32 are defined by a perimeter comprised of segments of the ring 34, outer and inner pedal legs 16 and 18, and the arches 36 and 38 respectively. The distance across the drive-stud slots 30 and 32 between the ring 34 and each of the arches 36 and 38 is equal to the diameter at the base 80 of the rear and front drive studs 60 and 62 respectively. The pedal body, the legs, the ring, and the cage may be constructed of metal, plastic, other material, or combinations thereof.

Figure 4C:
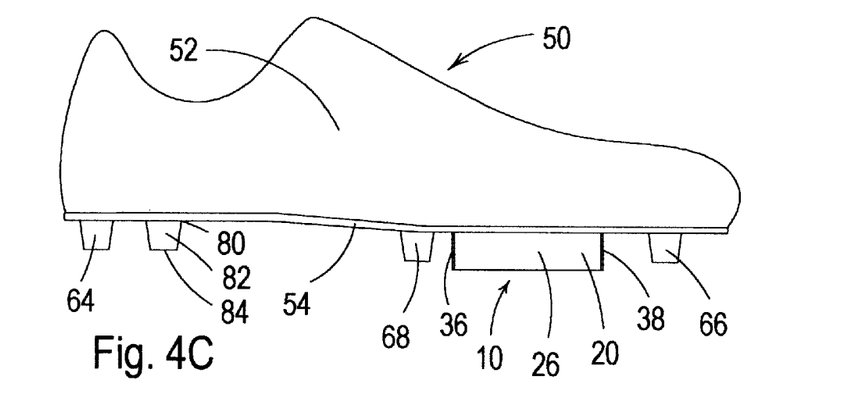
FIG. 4C shows an elevational outer-side view of the shoe on the pedal.
Figure 4D:
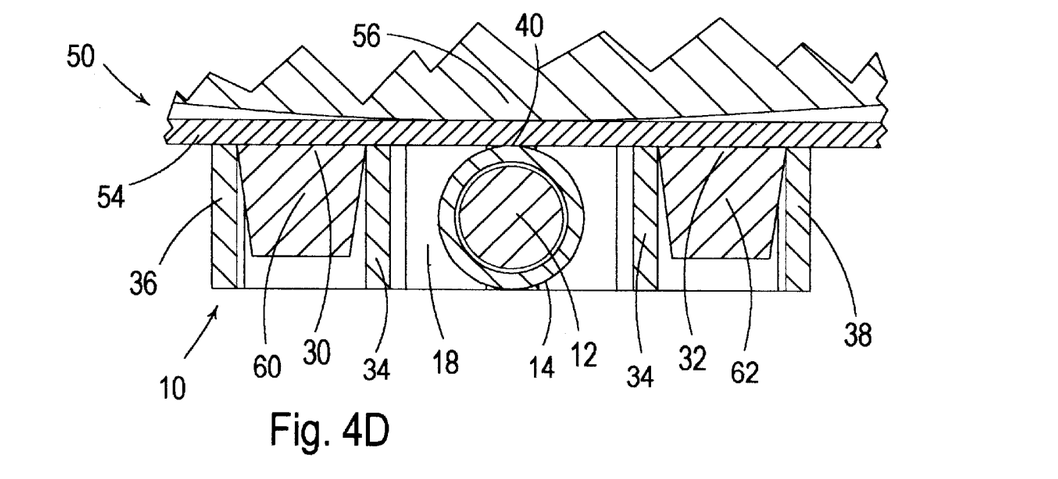
FIG. 4D shows an enlarged elevation outer-side sectional view of the pedal and part of the shoe taken on the line 4D—4D of FIG. 4B.

In the preferred embodiment of the shoe 50, rear and front drive studs 60 and 62 respectively are disposed in the middle region of the sole 54. As shown in FIGS. 4A–4C, when the shoe 50 is correctly in place on the pedal 10, the rear drive stud 60 and the front drive stud 62 are slidably sandwiched into the rear and front drive-stud slots 30 and 32. FIG. 4D shows that the ball-of-the-foot 56 is centered above the spindle 12 when the drive studs 60 and 62 are in place sandwiched between the ring 34 and the rear arch 36 and the front arch 38 respectively. FIGS. 3, 4A–4B show additional studs numbered according to location on the sole 54 with heel studs 64 toward the back, toe studs 66 toward the front, outer studs 68 along the outside (away from the bicycle), and inner studs 70 along the inside (toward the bicycle) of the sole.

Figure 5A:
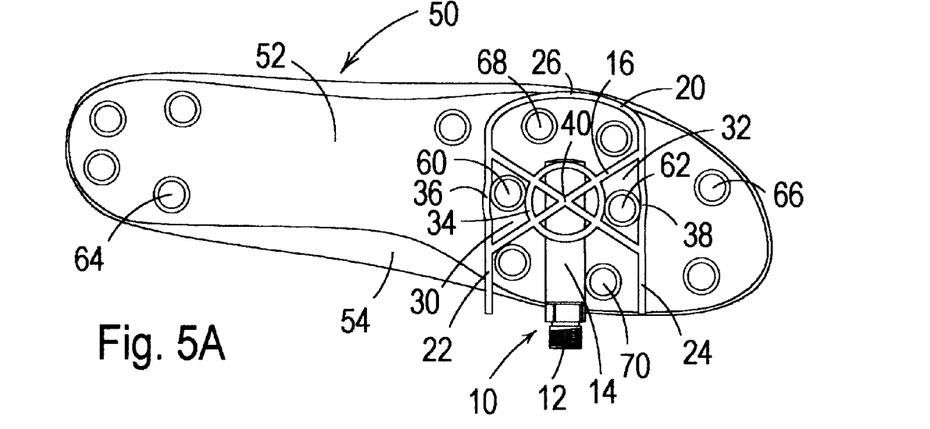
FIG. 5A shows a bottom plan view of the shoe on the pedal with outward float of the heel.
Figure 5B:
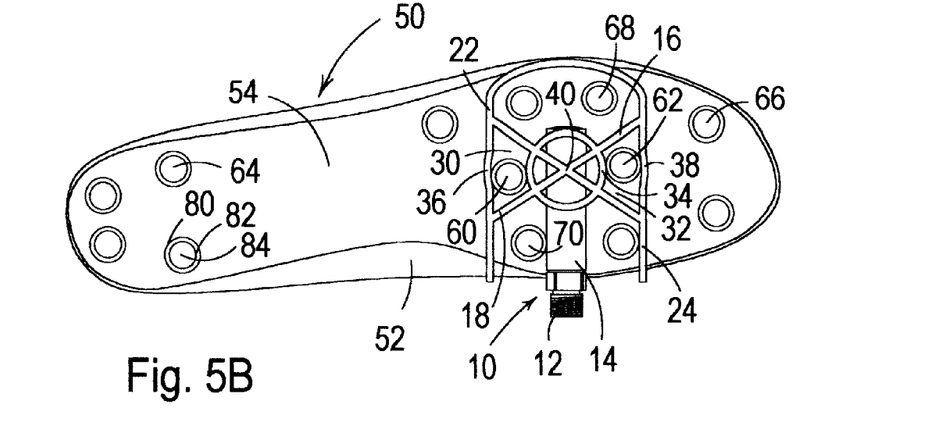
FIG. 5B shows a bottom plan view of the shoe on the pedal with inward heel float.

FIGS. 5A–5B show bottom views of the shoe 50 in different positions on the pedal 10. In FIG. 5A, the heel studs 64 have pivoted outward relative to the pedal and the toe studs 66 inward. Within the rear and front drive-stud slots 30 and 32, the rear drive stud 60 slid outward and the front drive stud 62 inward as the shoe rotated around the pivot point 40. In FIG. 5B, the heel studs 64 and rear drive stud 60 have rotated inward and the toe studs 66 and front drive stud 62 outward. In FIGS. 4A–4D the drive studs 60 and 62 within the slots 30 and 32 are contiguous to the pedal 10, but none of the other studs 64, 66, 68, and 70 are in contact with the pedal. In FIGS. 5A–5B with the shoe pivoted outward or inward, the inner studs 66 abut the pedal in various places such as the pedal body 14, inner legs 18, and front cross member 24.

Figure 6:
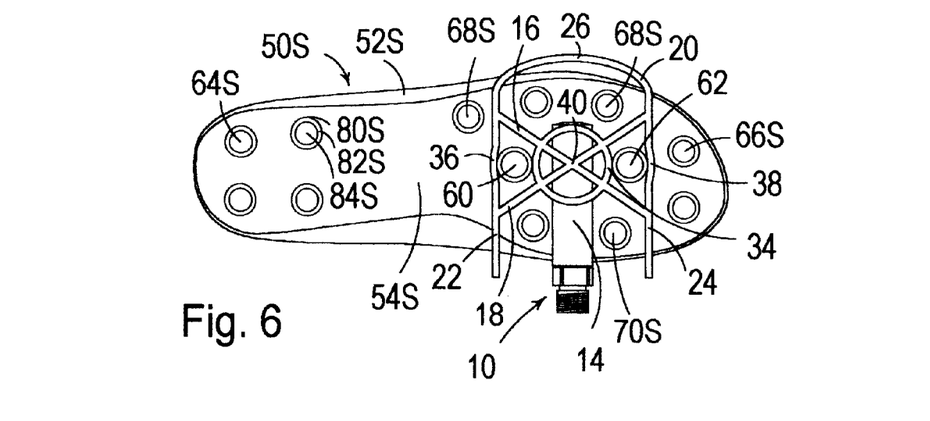
FIG. 6 shows a bottom plan view of a smaller shoe on the pedal.

FIG. 6 displays a bottom view of a smaller shoe 50S on the pedal 10. The smaller shoe 50S is comprised of an upper portion 52S and a sole 54S with a plurality of studs. The drive studs 60 and 62 positioned within the drive-stud slots 30 and 31 are of the same size as those on the shoe 50 described above. The remaining studs have smaller diameter bases 80S and caps 84S than the drive studs 60 and 62 and are disposed with heel studs 64S toward the back, toe studs 66S toward the front, outer studs 68S toward the outside, and inner studs 70S toward the inside (in the direction of the bicycle) of the sole.

Operation—FIGS. 3, 4A–4D, 5A, 5B, and 6—Preferred Embodiment of a Shoe and a Pedal The manner of using the shoe begins with the cyclist (not shown) raising the shoe 50 above the pedal 10 as illustrated in FIG. 3. The cyclist places the shoe on whichever side of the pedal is facing upward. Together the pedal body 14, the outer and inner legs 16 and 18, the ring 34, and the cage 20 support the sole 54 of the shoe as shown in FIG. 4A. If the cyclist happens to place the shoe on the pedal in correct alignment with the ball-of-the-foot 56 centered above the pedal spindle 12 as shown in FIG. 4D, the shoe 50 will drop into the position illustrated in FIGS. 4A–4D. The drive studs 60 and 62 slip into the drive-stud slots 30 and 32 sandwiched between the ring 34 and the rear and front arches 36 and 38 respectively. More commonly, as the cyclist brings the shoe into contact with the pedal, the caps 84 of some of the studs will come into contact with the pedal body, ring, legs, or cage. This contact of stud caps 84 with the pedal prevents the sole 54 from coming to rest on the pedal 10 until the shoe is moved into proper alignment. The cyclist then moves the shoe 50 until the drive studs 60 and 62 drop into position in the drive-stud slots 30 and 32. As shown in FIG. 4D, the sloped walls 82 of the drive studs, with diameter smaller at the caps 84 than at the bases 80, enables the drive studs 60 and 62 to slide more easily into the drive-stud slots 30 and 32 than if the stud walls 82 were perpendicular to the sole 54. Moving the shoe into position on the pedal can be done by feel without looking at the pedal and generally takes no longer than a second or so.

As illustrated in FIGS. 4B and 4D, the position of the drive studs 60 and 62 in relation to the pedal 10 enables the cyclist to exert forward and backward force on the pedal with power transferred from the shoe 50 through the drive studs to the arches 36 and 38 and the ring 34. On the forward stroke, the rear drive stud 60 pushes forward on the ring 34 while the front drive stud 62 exerts forward pressure on the front arch 38. On the backward stroke, the rear drive stud 60 pulls back on the rear arch 36 while the front drive stud 62 pulls back on the ring 34. The sandwiching of the drive studs in the drive stud slots 30 and 32 prevents the sole 54 from sliding forward or backward on the pedal 10.

When removing the shoe from the pedal, the cyclist uses the same motion learned as a child when starting to lose balance, that is, the foot is lifted up and then moved down and outward to the ground. This requires little or no conscious thought, unlike the heel twist required with straps and clipless systems (not shown). As FIG. 4D illustrates, the slightly sloped, frusto-conical stud walls 82 allow the drive studs 60 and 62 to be removed more easily from the drive-stud slots 30 and 32 than if the walls were perpendicular to the sole 54. If a sudden sideways movement of the bicycle occurs (this may happen for example if a tire slips sideways on a steeply sloped trail), the shoe 50 readily disengages from the pedal 10 with the drive studs 60 and 62 unconstrained in the lateral or sideways plane. That is, while the ring 34 and the arches 36 and 38 sandwich the drive studs 60 and 62 from the front and rear, the studs are not sandwiched on the outer and inner sides (away from and toward the bicycle) of the drive-stud slots 30 and 32. If the drive studs 60 and 62 were closely enclosed on the sides of the drive-stud slots by the pedal legs 16 and 18, the drive studs could become jammed within the pedal in a sideways fall with potential injury to the cyclist. Jamming does not occur in a forward or backward fall because the pedal 10 readily rotates on the spindle 12 enabling the drive studs 60 and 62 to pull out easily. Thus the removal of the shoe from the pedal is executed efficiently, rapidly, and safely, and the cyclist can keep the shoe 50 in firm contact with the pedal 10 when powering over obstructions in treacherous terrain.

When encountering wet conditions, the spacing of studs 60, 62, 66, 68, and 70 shown in FIG. 3 helps to prevent mud from building up on the sole 14. When mud does adhere to the shoe 50 or the pedal 10, the shoe still can be readily placed on and engaged with the pedal. The frusto-conical stud shape illustrated in FIG. 4D with a smaller diameter at the cap 84 than at the base 80, facilitates insertion of the drive studs 60 and 62 into the drive-stud slots 30 and 32. As the drive studs push downward between the ring 34 and the arches 36 and 38, accumulated mud is forced down through the drive-stud slots and out the bottom of the pedal 10.

The heel studs 64, toe studs 66, outer studs 68, and inner studs 70 shown in FIG. 3 have two primary functions involved with the operation of the shoe 50 when the cyclist has dismounted and is traveling on foot. One function is to provide traction when the cyclist is walking or running with the bicycle. The heel studs 64 prevent slipping as the shoe 50 strikes the ground. The toe studs 66 grip the turf as the wearer pushes off toward the next step. The outer studs 68 and inner studs 70 provide additional traction. Being disposed near the side edges of the sole 54, the inner and outer studs also prevent the shoe from turning over sideways thus protecting the wearer from spraining an ankle. The drive studs 60 and 62 provide additional traction and balance for the shoe.

The second function of studs 64, 66, 68, and 70 is to counterbalance the effect of the drive studs. That is, the drive studs 60 and 62 disposed toward the center of the sole 54 would result in a seesaw effect from front to back and side to side if the other studs were not disposed toward the rear, front, outer, and inner edges of the sole. The placement of the outer studs 68 and the inner studs 70 along the edges of the sole 54 is essential to provide stability of the shoe 50 when walking or running. That is, if the outer studs 68 or inner studs 70 were disposed more toward the center of the sole 54, the cyclist would risk turning an ankle when walking on the shoe 50.

As shown in FIG. 3 compared to FIGS. 1 and 2, the position of the legs 16 and 18 closer to the center than to the outside or inside of the pedal 10 allows the sole 54 to rest firmly on the pedal with the outer studs 65 and the inner studs 70 evenly spaced along the outer and inner edges of the sole but not in contact with the pedal legs. The ring 34 provides structural support to the legs 16 and 18 compensating for their placement toward the center or pivot point 40 of the pedal 10.

FIGS. 5A and 5B illustrate the shoe 50 pivoting outward and inward on the pedal 10. The concentric positioning of the ring 34 and the arches 36 and 38 of the drive-stud slots 30 and 32 channels the drive studs 60 and 62 in rotation around the pivot point 40. This allows the cyclist, by lifting the sole 54 slightly off the pedal, to rotate or float the shoe on the pedal to a position that is more comfortable for peddling. At the same time, the arc-shape of the arches 36 and 38 prevent the drive studs 60 and 62 from sliding sideways in the same direction within the drive-stud slots 30 and 32. That is, the sole 54 can pivot with the rear drive stud 60 sliding outward while the front drive stud 62 slides inward or vice versa. The convex curvature of the opposite arches 36 and 38 prevents the two drive studs from sliding inward or outward in unison within the drive-stud slots. Regardless of the direction of float, the drive studs 60 and 62 maintain a firm grip of the shoe 50 on the pedal 10 for optimal peddling efficiency. Contact of the pedal 10 with the inner studs 70 when the shoe is fully rotated to the outside or inside is a result of limited space for placement of the inner studs. This incidental contact of inner studs with the pedal does not effect the operation of the shoe and pedal.

The smaller shoe 50S shown in FIG. 6 functions in the same manner as described for the larger shoe 50. With each successive sole size as determined by the physical characteristics of the bicyclist, some changes in positioning of studs 64S, 66S, 68S, and 70S on the sole 54S is necessary. When properly aligned, the changes do not effect the functioning of the shoe 50S.

Figure 7:
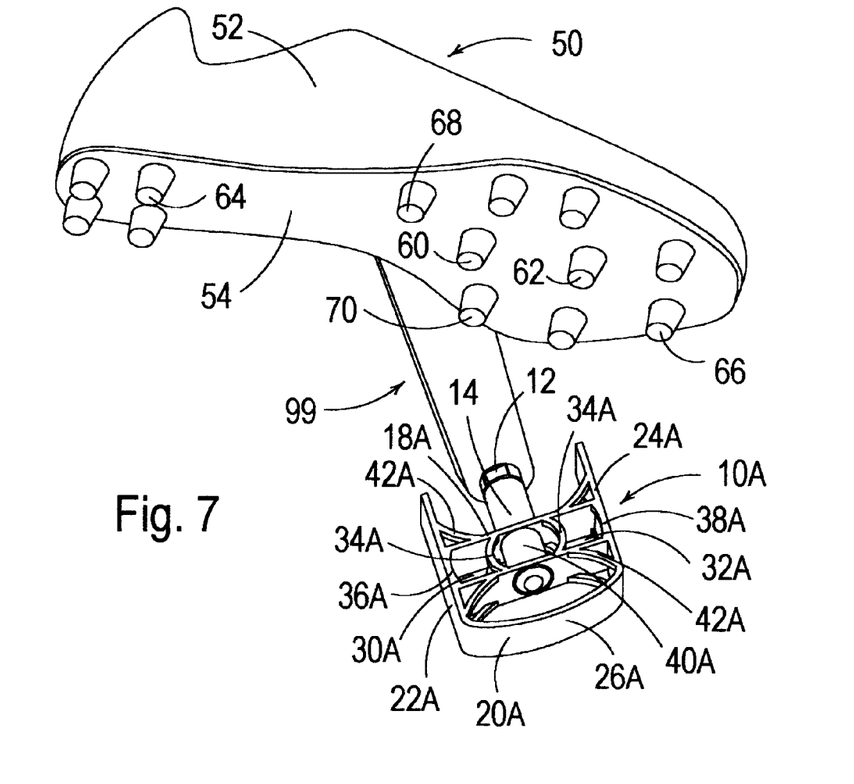
FIG. 7 shows a perspective view of the shoe above an alternate pedal.
Figure 8A:
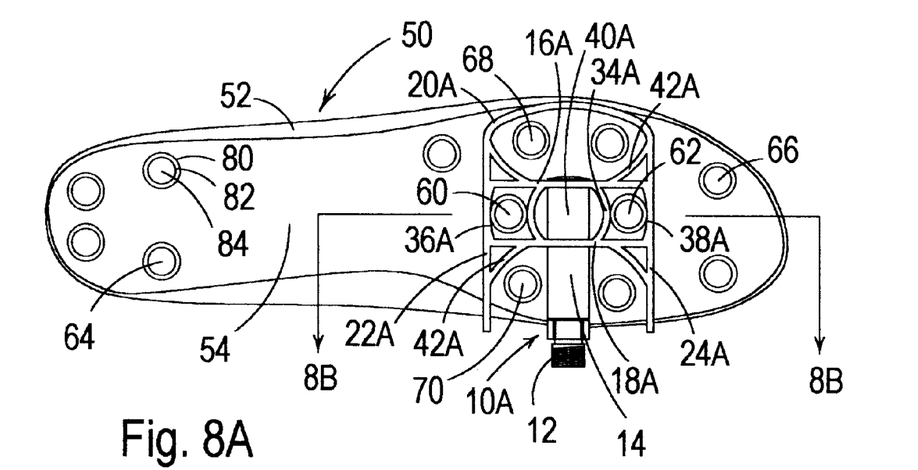
FIG. 8A shows a bottom plan view of the shoe on the alternate pedal.
Figure 8B:
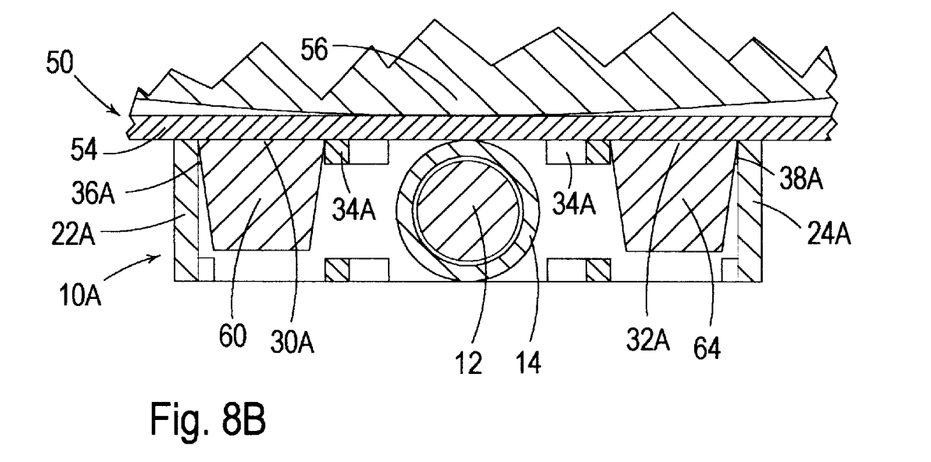
FIG. 8B shows an enlarged elevation outer-side sectional view of the alternate pedal and part of the shoe taken along lines 8B—8B of FIG. 8A.

Description—FIGS. 7, 8A, and 8B—Alternate Embodiment of a Pedal with the Shoe

An alternate embodiment of a pedal 10A with the shoe 50 is illustrated in FIGS. 7, 8A, and 8B. As shown in the bottom plan view of FIG. 8A, the pedal 10A is comprised of a threaded spindle 12 journalled in a pedal body 14. As illustrated in the perspective view of FIG. 7, the threaded spindle 12 is engaged in a crankarm 99 of a bicycle (not shown). A plurality of outer legs 16A and inner legs 18A extend from the pedal body 14 to a cage 20A. The outer legs and inner legs 16A and 16B are disposed toward the middle portion or pivot point 40A of the pedal. Support struts 42A are positioned between the legs 16A and 18A and the cage 20A.

As shown in FIGS. 7 and 8A, arched struts 34A connect the outer legs 16A and inner legs 18A between the body 14A and the cage 20A. The cage is comprised of a rear cross member 22A connected to a front cross member 24A by an outer cross member 26A. Curved, arched ridges 36A and 38A are attached to the portions of the rear and front cross members 22A and 24A respectively between the outer legs 16A and the inner legs 18A. The rear and front arched ridges 36A and 38A share a center or pivot point 40A with the arched struts 34A. The pivot point 40A is located at the center of the pedal body 24A midway between the inner and outer pedal legs. Rear and front drive-stud slots 30A and 32A are defined by perimeters comprised of the arched struts 34A, the outer and inner pedal legs 16A and 18A, and the arched ridges 36A and 38A. The distance across the rear and front drive-stud slots 30A and 32A between the arched struts 34A and each of the arched ridges 36A and 38A is equal to the diameter at the base 80 of the rear and front drive studs 60 and 62 respectively.

With the shoe 50 correctly in place on the alternate pedal 10A as illustrated in FIGS. 8A and 8B, the rear drive stud 60 and the front drive stud 62 are slidably sandwiched in the rear and front drive-stud slots 30A and 32A respectively. FIG. 8B shows that the ball-of-the-foot 56 is centered above the spindle 12. The outer studs 68 and inner studs 70 are not in contact with the pedal.

Operation—FIGS. 7, 8A–8B—Alternate Embodiment of a Pedal with the Shoe

The alternate pedal 10A operates with the shoe 50 in the same manner as the preferred embodiment of the pedal 10. As shown in FIGS. 7 and 8A, the support struts 42A provide structural support to the legs 16A and 18A and the cage 30A. The drive studs 60 and 62 slide within the drive-stud slots 30A and 32A as the cyclists pivots or floats the position of the shoe according to the cyclist's preference.

Figure 9:
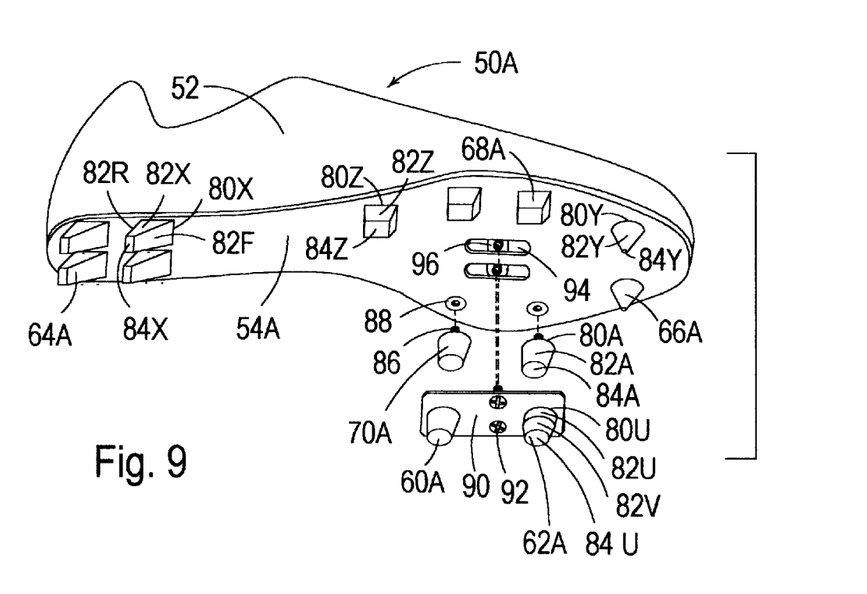
FIG. 9 shows a perspective view of a shoe with alternate studs and alternate means of attaching studs to the sole of the shoe.

Description—FIG. 9—Alternate Stud Shapes and Means of Attaching Studs

FIG. 9 illustrates an exploded perspective view of a shoe 50A with alternate stud shapes and stud-attachment means. The shoe has an upper portion 52 attached to a sole 54A. In FIG. 9, drive studs 60A and 62A, heel studs 64A, toe studs 66A, outer studs 68A and inner studs 70A are attachable to the sole 54A in the positions described for studs 60, 62, 64, 66, 68, and 70 on the sole 54 in FIG. 3. The inner studs 70A are shown in FIG. 9 detached from the sole 54A with conventional stud bolts 86 protruding from their bases 80A. The stud bolts 86 screw into conventional threaded stud sockets 88 disposed along the inside edge of the sole in FIG. 9, corresponding to the position of inner studs 70 illustrated in FIG. 3.

The rear and front drive studs 60A and 62A are shown in FIG. 9 mounted on a plate or cleat 90. Cleat bolts 92 screw into slidable nuts 96 housed in parallel sole slots 94. The parallel sole slots are of a type commonly used for attachment of clipless pedal cleats (not shown) to a shoe designed for clipless pedals (not shown). The remaining studs 64A, 66A and 68A could be permanently molded to or otherwise permanently attached to the sole, or they could be removable as shown in FIG. 9 for the inner studs 45A.

FIG. 9 also illustrates alternate stud shapes. The rear drive stud 60A and the inner studs 70A are of the frusto-conical shape previously described with a wall 84A extending between round bases 80A and caps 84A. The front drive stud 62A has an alternate shape with a cylindrical wall 82U extending from a round base 80U. The cylindrical wall 82U is connected to a frusto-conical wall 82V that connects with a circular cap 84U.

Each of the heel studs 64A has a rectangular base 80X and a smaller rectangular cap 84X. A front wall 82F slopes gradually back from the base 80X to the cap 84X. A rear wall 82R slopes steeply from the cap 84X forward to the base 80X. Side walls 82X connect the front and rear walls 82F and 82R and the base 80X and cap 84X.

The toe studs 66A are conical frustums. Compared with the rear drive stud 60A and inner studs 70A that are also of frusto-conical shape, the toe-stud bases 80Y are of the same diameter, but the toe studs have smaller caps 84Y attached to more gradually sloped walls 82Y resulting in a more pointed shape. The outer studs 68A shown in FIG. 9 are rectangular pyramidal frustums with rectangular bases 80Z and smaller rectangular caps 84Z connected to flat, sloped walls 82Z.

Operation—FIG. 9—Alternate Stud Shapes and Means of Attaching Studs

Mounting drive studs 60A and 62A on a detachable cleat 90 is a method that could be used to allow forward or backward adjustment of drive studs. According to individual preference for the position of the shoe 50A on the pedal 10, the cyclist can slide the cleat bolts 92 forward or backward in the parallel sole slots 94 before tightening the cleat bolts 92 into the slidable nuts 96 housed in the sole slots. Such a cleat 90 also provides an option of using the shoe 50A with a clipless pedal (not shown) by removing the cleat with mounted drive studs and replacing it with a clipless cleat (not shown) matching the clipless pedal. This would enable the cyclist to use the same shoe 50A with the preferred pedal 10 in this invention for riding in difficult or muddy terrain and with a clipless pedal in easier conditions if so desired.

The cleat 90 with drive studs 60A and 62A also could be attached to a conventional clipless shoe (not shown) for use with the preferred pedal 10. The ease of walking on a clipless shoe with the cleat 90 with drive studs 60A and 62A attached depends on the configuration of any studs and lugs on the clipless shoe.

The remaining studs 64, 66, and 68 shown in FIG. 9 may be either permanently molded with or mounted to the sole 54A or may be removably attached. Permanent mounting can provide a strong and inexpensive bond to the sole. The conventional attachment means with stud bolts 86 and threaded stud sockets 88 illustrated for the inner studs 70A in FIG. 9 allow the cyclist to replace a worn or damaged stud (not shown) or to insert a stud with different performance characteristics.

If the shoe 50A is equipped with removable studs 70A, a particular stud composition, size, or shape can be selected according to riding conditions or cyclist's preference. The various shapes illustrated in FIG. 9 are presented as examples of different styles of studs that might be used, rather than as a recommended array on a sole 54A. For the front drive stud 62A, the cylindrical shape of the wall 82U extending from the base 80U perpendicular to the sole 54A provides a snugger fit in the front drive slot 32 and 32A shown in FIGS. 3 and 7. The frusto-conical wall 82V as illustrated in FIG. 9 facilitates insertion of the stud 62A into pedal slots 32 or 32A. A racing cyclist may prefer the tighter fitting front drive stud 62A, while a recreational cyclist would be likely to select a stud of the shape of the rear drive stud 60A that easily releases from the pedal.

The backward-sloping front wall 82F of the heel stud 64A enables the stud to slide over the ground as the cyclist extends the shoe outward for balance when making a sharp turn. In such a maneuver, the cyclist would want the stud 64A to slide across the ground rather than digging in. The rear wall 82R is shaped to grip the turf as the cyclist takes a step and pushes off from the heel stud.

The toe studs 66A with their pointed shape may be advantageous in climbing steep embankments by digging into a toe hold. The pointed shape also provides better traction in snow or icy conditions. The outer studs 68A in FIG. 9 of rectangular frusto-pyramidal shape provide better traction in loose dirt than the conical-shaped inner studs 70A.

CONCLUSION, RAMIFICATIONS, AND SCOPE

From the description above, a number of advantages of the use of studs with the corresponding shoe and pedal become evident:

(a) Insertion of the shoe onto the pedal is easier than with strap or clipless pedal systems.

(b) The drive studs sandwiched within the pedal enable the cyclist to exert forward pushing and backward pulling force on the pedal as well as downward pressure.

(c) The shoe is not locked or strapped to the pedal and thus is not prone to injuring the cyclist in an unanticipated stop.

(d) Due to the ease of release of the shoe from the pedal, the cyclist can maintain full engagement of the shoe with the pedal and optimal control of the bicycle when riding through steep or treacherous terrain.

(e) The shoe continues to function well with a pedal in muddy conditions.

(f) While the studs of this invention are adapted to bicycle pedaling, they were originally designed for field sports and function well in activities such as running and hiking through rough terrain commonly associated with mountain bicycling.

(g) The shoe functions well in snow or icy conditions.

(h) The shoe derived from soccer and football is designed to be lightweight and to enhance speed when running with good traction in slippery conditions.

(i) The invention consists simply of studs attached to the sole of a shoe to fit in slots between parts of a corresponding pedal.

(j) The shoe has no mechanical parts and engages with a simply designed pedal with no movable clamping mechanisms thus being lightweight and easy to maintain.

Although the description above contains many specificities, these should not be construed as limiting the scope of the invention but should be regarded as merely providing illustrations of some of the presently preferred embodiments of this invention. For example, the studs can have other shapes such as pyramidal, oval, cylindrical, multisided, etc.; other sizes such as shorter, taller, thinner, broader, etc.; and other placements on the sole and in relation to a pedal. Studs of varying construction, shape, and size may be used on a single shoe. Specific locations of studs on the heels, toes, inner and outer sides of the sole may vary and may be omitted in some embodiments of the shoe. Studs may be attached to soles by various means, for example, by being permanently molded to or integrally part of a sole, by removable attachment via a threaded bolt inserted into a socket mounted on the sole, by mounting on a plate that is secured to the sole with bolts that allow variable positioning of studs on the sole, etc. Pedals may match up to studs using the ring and arch design, the arched strut and arched ridge design, or various configurations that sandwich studs for efficient power transfer from shoe to pedal. Thus the scope of the invention should be determined by the appended claims and their legal equivalents, rather than by the examples given.

I claim:

1. A bicycle pedal comprising a threaded spindle journalled in a pedal body connected to a pedal cage by a plurality of legs, wherein a cylindrical ring transects said legs and said pedal body, and said pedal including one or more slots between said ring and said cage, at least one of said slots comprising a means for engaging one or more studs attached to a sole of a bicycle shoe, each of said studs comprising a base attached to said sole of said shoe, a cap that contacts the ground when a wearer of said shoe takes a step, and a wall or walls connecting the base with the cap, the width from front to back of at least one of said slots being approximately equal to the width at the base of at least one of said studs such that, when engaged in said slot, the wall or walls of said stud are contiguous to said slot, said contiguity comprising a forward and backward power-transferring means between said shoe and said pedal, and a separation existing between said pedal and said studs except where said slots abut the walls of said studs, said separation comprising an unimpeded-upward-release means thereby preventing said studs from being clipped, locked, or otherwise secured to said pedal and enabling a cyclist to expeditiously remove said shoe from said pedal by raising said shoe up from said pedal.

2. A bicycle pedal comprising a threaded spindle journalled in a pedal body connected to a pedal cage by a plurality of legs, wherein at least one plate or strut is positioned between at least two of said legs, and said pedal including one or more slots between said strut and said cage, at least one of said slots comprising a means for engaging one or more studs attached to a sole of a bicycle shoe, each of said studs comprising a base attached to said sole of said shoe, a cap that contacts the ground when a wearer of said shoe takes a step, and a wall or walls connecting the base with the cap, the width from front to back of at least one of said slots being approximately equal to the width at the base of at least one of said studs such that, when engaged in said slot, the wall or walls of said stud are contiguous to said slot, said contiguity comprising a forward and backward power-transferring means between said shoe and said pedal, and a separation existing between said pedal and said studs except where said slots abut the walls of said studs, said separation comprising an unimpeded-upward-release means thereby preventing said studs from being clipped, locked, or otherwise secured to said pedal and enabling a cyclist to expeditiously remove said shoe from said pedal by raising said shoe up from said pedal.

3. A bicycle pedal comprising a threaded spindle journalled in a pedal body connected to a pedal cage by a plurality of legs, and said pedal including one or more slots comprising a means for engaging one or more studs attached to a sole of a bicycle shoe,
each of said studs comprising a base attached to said sole of said shoe, a cap that contacts the ground when a wearer of said shoe takes a step, and a wall or walls connecting the base with the cap, and the width from front to back of at least one of said slots being approximately equal to the width at the base of at least one of said studs such that, when engaged in said slot, the wall or walls of said stud are contiguous to said slot,
said contiguity comprising a forward and backward power-transferring means between said shoe and said pedal, and wherein a pivot point serves as a center for concentric arcs comprising forward and rear perimeters of at least one of said slots,
said slot-perimeters comprising a means for channeling at least one of said studs in rotation around said pivot point whereby a cyclist floats said shoe to a comfortable position, and a separation existing between said pedal and said studs except where said slots abut the walls of said studs,
said separation comprising an unimpeded-upward-release means thereby preventing said studs from being clipped, locked, or otherwise secured to said pedal and enabling a cyclist to expeditiously remove said shoe from said pedal by raising said shoe up from said pedal.

* * * * *